(12) United States Patent
Secker-Walker et al.

(10) Patent No.: US 9,269,355 B1
(45) Date of Patent: Feb. 23, 2016

(54) LOAD BALANCING FOR AUTOMATIC SPEECH RECOGNITION

(71) Applicant: Amazon Technologies, Inc., Reno, NV (US)

(72) Inventors: Hugh Evan Secker-Walker, Newburyport, MA (US); Naresh Narayanan, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 323 days.

(21) Appl. No.: 13/831,286

(22) Filed: Mar. 14, 2013

(51) Int. Cl.
*G10L 15/00* (2013.01)
*G10L 15/22* (2006.01)

(52) U.S. Cl.
CPC ..................... *G10L 15/22* (2013.01)

(58) Field of Classification Search
CPC ..... G10L 15/30; G10L 15/142; G10L 15/285; G10L 15/00; G10L 15/32; G10L 15/02; G10L 15/197; G10L 15/22; G10L 15/14; G10L 15/187; G10L 15/193; G10L 15/28
USPC ............... 704/1–10, 211, 244, 254, 207, 277, 704/242, 235, 257, 240, 231, 250, 255
See application file for complete search history.

(56) References Cited

U.S. PATENT DOCUMENTS

| | | | |
|---|---|---|---|
| 2005/0010412 A1* | 1/2005 | Aronowitz | 704/254 |
| 2005/0080632 A1* | 4/2005 | Endo et al. | 704/277 |
| 2008/0120094 A1* | 5/2008 | Mate et al. | 704/201 |
| 2010/0191524 A1* | 7/2010 | Washio et al. | 704/207 |
| 2012/0016662 A1* | 1/2012 | Boldyrev et al. | 704/9 |
| 2012/0215528 A1* | 8/2012 | Nagatomo | 704/211 |
| 2012/0245940 A1* | 9/2012 | Willett et al. | 704/244 |

OTHER PUBLICATIONS

Gales, M., & Young, S. (2008). The application of Hidden Markov Models in speech recognition. *Foundations and Trends® in Signal Processing*. Now Publishers Inc., 1(3):195-304.
Huang, X., Acero, A., & Hon, H.-W. (2001). Spoken Language Processing: A Guide to Theory, Algorithm, and System Development. Upper Saddle River, NJ: Prentice Hall. Table of contents.
Jelinek, F. (1997). Statistical Methods for Speech Recognition. Cambridge: MIT Press. Table of contents.
Jurafsky, D., & Martin, J. (2008). Speech and Language Processing: An Introduction to Natural Language Processing, Computational Linguistics, and Speech Recognition (2nd Ed.). Upper Saddle River, NJ: Prentice Hall. Table of contents.
Rabiner, L.R., & Juang, B.H. (1993). *Fundamentals of Speech Recognition*. Englewood Cliff, New Jersey: Prentice-Hall. Table of contents.
U.S. Appl. No. 13/434,315, filed Mar. 29, 2012.

* cited by examiner

*Primary Examiner* — Huyen Vo
(74) *Attorney, Agent, or Firm* — Knobbe Martens Olson & Bear, LLP

(57) ABSTRACT

Features are disclosed for transferring speech recognition workloads between pooled execution resources. For example, various parts of an automatic speech recognition engine may be implemented by various pools of servers. Servers in a speech recognition pool may explore a plurality of paths in a graph to find the path that best matches an utterance. A set of active nodes comprising the last node explored in each path may be transferred between servers in the pool depending on resource availability at each server. A history of nodes or arcs traversed in each path may be maintained by a separate pool of history servers, and used to generate text corresponding to the path identified as the best match by the speech recognition servers.

21 Claims, 4 Drawing Sheets

LOAD BALANCING FOR AUTOMATIC SPEECH RECOGNITION

BACKGROUND

Automatic speech recognition ("ASR") systems convert speech into text. As used herein, the term "speech recognition" refers to the process of converting a speech (audio) signal to a sequence of words or a representation thereof (text). Speech recognition applications that have emerged over the last few years include voice dialing (e.g., "Call home"), call routing (e.g., "I would like to make a collect call"), simple data entry (e.g., entering a credit card number), preparation of structured documents (e.g., a radiology report), and content-based spoken audio searching (e.g., finding a podcast where particular words were spoken).

In converting audio to text, ASR systems may employ models, such as an acoustic model and a language model. The acoustic model may be used to convert speech into a sequence of phonemes most likely spoken by a user. A language model may be used to find the words that most likely correspond to the phonemes. In some applications, the acoustic model and language model may be used together to transcribe speech.

An ASR system may employ an ASR engine to recognize speech. The ASR engine may perform a search among the possible utterances that may be spoken by using models, such as an acoustic model and a language model. In performing the search, the ASR engine may limit its search to some subset of all the possible utterances that may be spoken to reduce the amount of time and computational resources needed to perform the speech recognition.

Early ASR systems were limited in that they had a small vocabulary, could recognize only discrete words, were slow, and were less accurate. For example, early ASR systems may recognize only digits or require the user to pause between speaking each word. As technology progressed, ASR systems were developed that are described as large-vocabulary, continuous speech recognition or LVCSR. LVCSR systems provided improvements over the early systems, including larger vocabularies, the ability to recognize continuous speech, faster recognition, and better accuracy. For example, LVCSR systems may allow for applications such as the dictation of documents. As the technology has improved and as computers have become more powerful, LVCSR systems have been able to handle larger and larger vocabularies and increase accuracy and speed.

As LVCSR systems increase in size, the ASR engine performing the search may have a more complicated task and may require a significant amount of computing resources and time to perform the search. Certain devices, such as smartphones, tablet computers, and others, may lack the computing resources necessary to perform LVCSR or other types of ASR. It may also be inconvenient or inefficient to provide the hardware or software necessary for ASR on certain devices. As an alternative to implementing ASR directly on unsuitable devices, an ASR engine may be hosted on a server computer that is accessible via a network. Various client devices may transmit audio data over the network to the server, which may recognize any speech therein and transmit corresponding text back to the client devices. This arrangement may enable ASR functionality to be provided on otherwise unsuitable devices despite their limitations.

As mentioned above, ASR may be computationally intensive. However, the amount of computational resources required for ASR may also vary substantially depending on the content of the speech that is being recognized. For example, certain words or phrases may require substantially more resources to recognize than others. Accordingly, a server with sufficient resources to perform ASR on the most complex parts of an audio stream will be underutilized when working on less complex parts. To avoid underutilization, particularly in hosted environments of the sort described above, a single server may be used to perform ASR on several audio streams at once. However, when one or more of the streams becomes too complex, the server will be overloaded and unable to keep up. Of course, overloading may be avoided by adding additional servers and configuring each one to handle fewer audio streams, but then many of the servers will end up being underutilized once again.

Additional background information on ASR systems may be found in L. R. Rabiner and B. H. Juang, Fundamentals of Speech Recognition, Prentice-Hall, Englewood Cliff, N.J., 1993; F. Jelinek, Statistical Methods for Speech Recognition, MIT Press, 1997; X. Huang, A. Acero, H.-W. Hon. Spoken Language Processing, Prentice Hall, 2001; D. Jurafsky and J. Martin, Speech and Language Processing (2nd edition), Prentice Hall, 2008; and M. Gales and S. Young, The Application of Hidden Markov Models in Speech Recognition, Now Publishers Inc., 2008; which are incorporated herein by reference in their entirety.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, the present disclosure relates to shifting ASR workloads between multiple execution resources, such as servers. Although much of the discussion herein is phrased in terms of servers, techniques of the present disclosure may be used to transfer workloads between various kinds of execution resources, including computing devices, virtual machines, processors, processor cores, logical processes, threads, or the like.

As mentioned above, servers that run ASR engines may be prone to both underutilization and overloading because of the variability of computational demand associated with such engines. In order to maintain reliable performance in spite of this variability, it may be necessary to maintain a buffer of unused processing capacity that is sufficient to accommodate anticipated variations in demand. For a single server performing ASR on a small number of audio streams, a large variation in the demand of any one stream may have a substantial effect on overall demand for the server's resources. Accordingly, a substantial capacity buffer may be needed to ensure that the server can keep up with demand as it fluctuates. For a pool of such servers, each server may have its own buffer, and the total unused capacity in the pool may be substantial. However, when workloads can be transferred, a pool of multiple servers can share their collective capacity. Accordingly, there may no longer be a need to maintain sufficient unused capacity on each individual server to accommodate anticipated variations in the audio streams. Rather, an audio stream that suddenly demands increased resources may be transferred to any available server in the pool that has unused capacity. As a result, the average per-server utilization may be increased while still accommodating the variations in demand that are common with ASR workloads.

The processing demand associated with ASR may be highly variable as a general matter, but some parts of ASR are more variable than others. The processing demand associated with certain parts of ASR may be comparatively uniform. For this and other reasons, it may be beneficial to implement various parts of an ASR engine separately, e.g., on separate servers, etc. Separating the parts in this manner allows each part to be managed and optimized individually. For example, when additional capacity is needed to handle increased resource demand associated with a more variable part of ASR, servers can be provisioned specifically for that purpose. In another example, servers used for each part of ASR may be configured with various capabilities, e.g., depending on whether the relevant part is processor-bound, memory-bound, etc. Thus, implementing different parts of ASR on different servers may provide various advantages.

Figure 1:
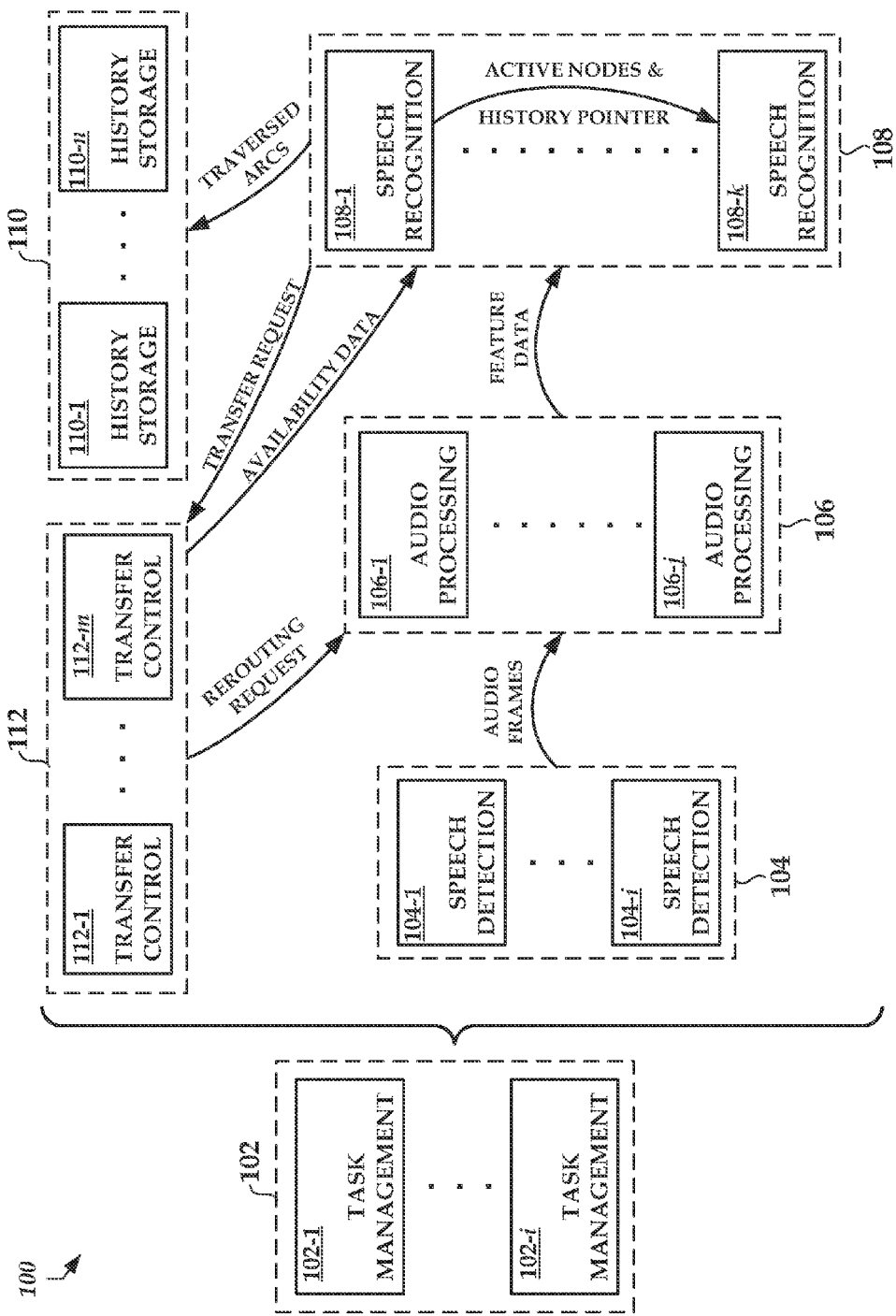
FIG. 1 is a block diagram of an illustrative environment in which ASR workloads may be processed by various pools of execution resources.

FIG. 1 shows an example of a system in which various parts of ASR may be handled by separate resource pools. System 100 comprises task management pool 102, speech detection pool 104, audio processing pool 106, speech recognition pool 108, history storage pool 110, and transfer control pool 112. This division of parts is merely illustrative, and various combinations of parts may be implemented with various combinations of resource pools. Parts of ASR discussed with respect to separate resource pools herein may be implemented together in a single resource pool, and parts illustrated by a single resource pool herein may be divided among multiple resource pools. Moreover, a resource pool may consist of a single or partial execution resource, rather than multiple resources.

System 100 may provide ASR functionality to a plurality of client devices. Such devices may connect to system 100 over a network. The network may be any wired network, wireless network, or combination thereof. In addition, the network may be a personal area network, local area network, wide area network, cable network, satellite network, cellular telephone network, or combination thereof. For example, the network may be a publicly accessible network of linked networks, possibly operated by various distinct parties, such as the Internet. In some embodiments, the network may be a private or semi-private network, such as a corporate intranet. The network may include one or more wireless networks, such as a Wi-Fi network, a Global System for Mobile Communications (GSM) network, a Code Division Multiple Access (CDMA) network, a Long Term Evolution (LTE) network, or some other type of wireless network. Secured protocols such as Hypertext Transfer Protocol Secure (HTTPS) may be used to secure communications across the network, e.g., by encryption. Protocols and components for communicating via the Internet or any of the other aforementioned types of networks are well known to those skilled in the art of computer communications and thus, need not be described in more detail herein.

System 100 may include a task management resource pool, such as pool 102. Pool 102 may include one or more servers (or other execution resources), such as servers 102-1 to 102-$i$ of FIG. 1. The task management servers may interact externally with client devices over the aforementioned network, as well as internally with other parts of system 100, over the same network or a separate network. A load balancer (not shown) may be used to assign client devices to the servers of the task management pool. External interactions may include keeping track of incoming connections from various clients, streaming audio from each client, transmitting ASR status information such as start-of-speech, wakeword-detected, task-domain-grammar-active, end-of-speech, and transmitting ASR results once they are determined. Internal interactions may include coordinating the various parts of the ASR process across multiple servers and resource pools, e.g., by routing incoming audio streams to speech detection pool 104 or by receiving history data from the history storage pool 110. In some embodiments, task management servers may also be responsible for tracking which resources in each pool are available to be tasked with additional workloads. In some pools, resource availability may fluctuate with the content of incoming audio, while in other pools resources may simply become available as workloads are finished. In either case, it may be beneficial for servers in task management pool 102 to monitor resource availability in other pools. Servers in task management pool 102 may be configured to communicate with servers in any or all of the other resource pools.

Once a connection is established with a client device and audio begins to arrive, the audio stream may be routed to a server in speech detection pool 104. The server may monitor the incoming audio stream and detect when speech begins. For example, speech detection may be based on the amplitude or harmonicity of the audio signal in the incoming stream, or on simple acoustic modeling and classification. Other speech detection methods may be used, as well. Systems and methods for detecting the presence of speech in an audio stream are well known to persons skilled in the art of ASR, and need not be described in further detail. When the server in pool 104 detects the beginning of speech, it may forward relevant segments of the audio stream to audio processing pool 106 for the next part of ASR. Segments that do not contain speech may not need to be processed further, and therefore may not be forwarded. In some embodiments, speech detection may be relatively low in computational complexity, so the number of servers in speech detection pool 104 may be lower than the number of servers in some other resource pools.

As described above, audio frames that contain detected speech may be forwarded to audio processing pool 106. Servers in this pool may receive the audio frames and process them to extract relevant features. Features may be determined from measurements or observations of the audio, and they may be used to recognize units of speech with which they are correlated. For example, a feature may comprise a measurement of the energy in certain frequency bands of the audio signal, and specific energy levels in these frequency bands may be correlated with the presence of particular phonemes, which are basic units of speech. In this example, the correlation between the feature and the phonemes makes the feature useful for recognizing those phonemes, and by extension, words that contain them. In some embodiments, features may be expressed numerically as feature vectors. The use of features for recognizing speech units or combinations of speech units is described in greater detail below with respect to speech recognition pool 108.

Various kinds of features and various methods of determining them are known to persons skilled in ASR. For example, features may include mel frequency cepstral coefficients, perceptual linear prediction features, or neural network features.

The servers of audio processing pool 106 may be used with any appropriate features and any methods of feature extraction, whether presently known or unknown. In some embodiments, the audio processing servers may apply filters, transformations, or other pre-processing to the audio signal in order to extract more useful features. Specific examples of such pre-processing include vocal tract length normalization, log scaling, spectral subtraction, linear discriminant analysis, and affine linear transformations. The servers may also apply specific adaptations to the audio signal to improve results for particular speakers, client devices, or environments.

The features extracted from each frame of the audio stream by audio processing pool 106 are transmitted to speech recognition pool 108. The speech recognition servers in pool 108 may recognize speech content from sequences of features using an acoustic model, a lexicon, and a language model. The acoustic model may comprise mathematical models indicating relationships between features and speech units, such as phonemes, bi-phones, tri-phones, syllables, or other subword units. The acoustic models may be used to recognize speech units from the features using techniques known to persons of skill in the art, such as hidden Markov models, Gaussian mixture models, and discriminative training. The lexicon may comprise a list of known words. It may be a specific lexicon, e.g., for medical dictation, or a general purpose lexicon. The lexicon may comprise pronunciations for each word, defined in terms of the speech units that are recognized by the acoustic model. Some or all of the pronunciations may be stored in a prefix tree, graph, finite state transducer, or any other suitable format known to persons of skill in the art.

In addition to the acoustic model and the lexicon, the speech recognition servers may also include a language model. The language model may model the likelihood of various word orders in spoken speech. For example, the word "hello" may be more likely at the beginning of an utterance and the word "bye" may be more likely at the end of an utterance. The language model may also indicate likely sequences of words. For example, given the word "laptop," the next word may be more likely to be "computer" than "alligator." The language model may be based on any techniques known to one of skill in the art, for example using probabilities of bigrams, trigrams, or more generally n-grams of word occurrences. Other types of language models known to one of ordinary skill in the art include a structured language model and a maximum entropy language model. Language models of various types may be adapted to particular applications. For example, a language model for medical transcription may contain medical terms that may not appear in a language model for legal dictation. By adapting the language model to a particular application, the accuracy of the speech recognition servers may be improved. In addition to or instead of an acoustic model, lexicon, and language model, the speech recognition servers may use any suitable techniques or components known to persons of skill in the art.

The acoustic model, lexicon, and language model used by the speech recognition servers may be incorporated into a finite state transducer (FST). An FST is a graph that may include all possible utterances that may be recognized by an ASR engine. An FST may be static in that it is created before speech recognition begins and the same FST may be used for the recognition of all utterances. In this way an FST may differ from, e.g., an ASR engine that dynamically creates word result networks by successive application of an acoustic model, lexicon, and language model to particular set of features. Although FSTs are generally created before speech recognition begins, multiple FSTs may be dynamically linked together during the course of speech recognition, in order to create a larger FST. This larger FST may be customized, e.g., for a particular speaker or subject matter. Additional information on FSTs and dynamic decoding may be found in U.S. patent application Ser. No. 13/434,315, filed on Mar. 29, 2012, which is incorporated herein by reference in its entirety.

Figure 2:
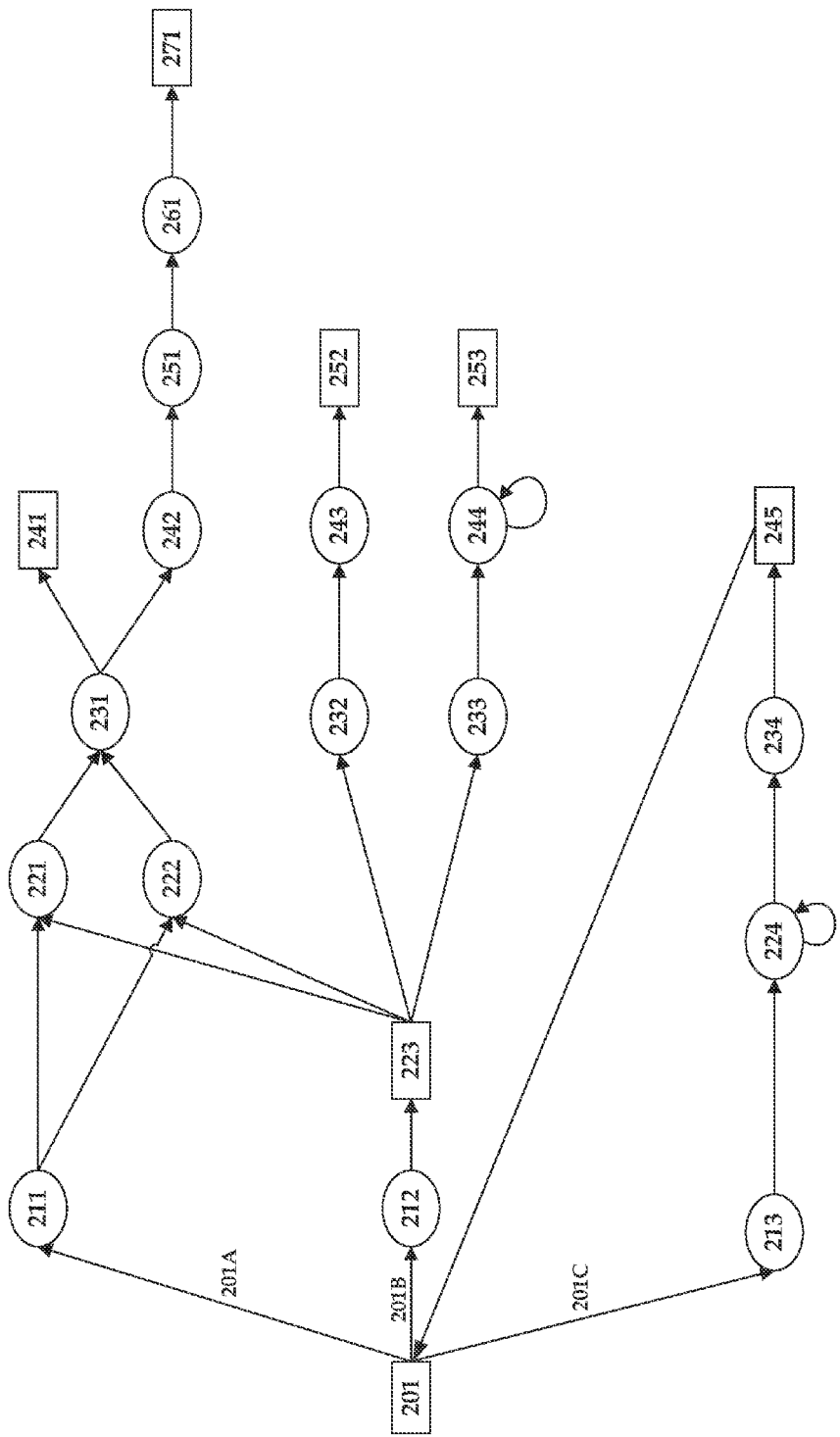
FIG. 2 is a conceptual diagram of depicting a directed graph of the sort that may be used for ASR.

FIG. 2 depicts a small graph that may be used for visualizing FSTs. Although an FST may include a large number of paths in order to account for all recognizable utterances, FIG. 2 contains very few paths because it is merely an example. In FIG. 2 and in FSTs generally, each path may comprise a sequence of nodes connected by arcs. For instance, one path in FIG. 2 comprises nodes 201, 213, 224, 234, and 245, connected by arcs beginning with arc 201C.

Each arc in an FST may correspond to a distinct unit of processing. Each unit of processing may take features as input and compute a score. The scores may indicate the likelihood that a particular speech unit or combination of speech units is present in an audio signal from which the features were extracted. The score for each arc may be combined with scores from previous arcs in the same path to determine an aggregate score for the path. In one example, a score from an individual arc may indicate the likelihood that a particular speech unit (e.g., a triphone) or portion of a speech unit, such as an HAW state, is present in the audio signal. In another example, scores from several arcs may be combined to indicate the likelihood that a specific word is present in the audio signal. Therefore, multiple arcs may correspond to a speech unit and multiple speech units may correspond to a word. Regardless of the number of arcs per speech unit, however, a path corresponding to a sequence of several speech units may be identified by traversing a plurality of arcs. Thus, an utterance comprising several words may be represented by a path in an FST, and the set of all paths that exist in an FST may correspond to the set of all utterances that the FST can recognize.

Referring to FIG. 2, a speech recognition server may begin recognition at initial node such as node 201. The speech recognition server may perform the processing steps associated with the arcs that depart from node 201. For example, the server may determine scores for arcs 201A, 201B, and 201C based on a set of feature vectors received from an audio processing server. After determining the scores, the speech recognition server may traverse each arc to reach additional nodes, such as nodes 211, 212, and 213. The server may calculate scores for each outgoing arc that originates at these additional nodes, in order to reach still further nodes, such as nodes 221, 222, 223, and 224. Thus, the server may traverse multiple paths simultaneously.

As explained above, a path may correspond to a sequence of speech units or words, and the scores associated with each arc in a particular path may be combined to produce an aggregate score for the path. The aggregate score may represent a likelihood that, taken together, the features processed by the arcs in the path are indicative of the particular sequence of words that the path corresponds to. The score determined at each arc, and by extension the aggregate scores for each path, may be based on an acoustic model, lexicon, and language model.

The speech recognition server may continue exploring paths in the graph until the incoming speech stops and the features run out, or until an ending node is reached. An ending node may be designated as such explicitly, or it may be recognized by a lack of outgoing arcs. Once the server is finished exploring a set of paths, the path with the highest aggregate score may be selected as the best. The best path may represent the sequence of words corresponding to the utterance that is most likely based on the input provided to the FST. A textual representation of this most-likely utterance may constitute the ASR output for a given audio input. Alternatively, the ASR output may comprise a lattice, tree, or N-best list. The best path may also be chosen based on additional or alternative criteria aside from the highest aggregate score.

As noted above, the speech recognition server may traverse multiple paths at once in order to find the best path for a particular set of inputs. Computational complexity may increase with each additional path that the server has to explore simultaneously because each path includes additional arcs, and each arc corresponds to a unit of processing. In order to limit this complexity, the server may stop traversing a path when the aggregate score for the path drops below a certain threshold, either in absolute terms or in comparison to other paths that the server is exploring. Nevertheless, a server may have to explore many paths simultaneously.

Certain portions of an FST may contain nodes with more outgoing arcs than other portions. When the speech recognition server explores a part of the FST in which most nodes have a large number of outgoing arcs, the number of paths to be explored may multiply quickly, and so too may the computational complexity. Whether the server ends up exploring a highly complex portion of the FST or a comparatively less complex portion may depend on the features that the server receives. One sequence of features may lead to high scores for certain paths, and further exploration along those paths. Another sequence of features may lead to low scores for the same paths, so that the server will quickly stop exploring them and focus on other parts of the FST instead. Thus, the computational resources required for a particular speech recognition workload may be highly variable, as noted above.

While exploring paths in the FST, the speech recognition server may store a reference to the most recently visited node in each path. This node may be referred to as the "active node" for a path. The server may traverse outgoing arcs from the current active node for each path, in each successive round of exploration. Each outgoing arc that is traversed may lead to a new active node. Thus, the server may be able to explore a set of paths using active nodes as starting points, without maintaining explicit knowledge of the previous arcs or preceding nodes that were explored in each path.

While an FST may be expansive, occupying several gigabytes or more of data storage, a set of active nodes may be comparatively small, occupying perhaps several kilobytes. Accordingly, a set of active nodes may be transferred rapidly between servers. The possibility of rapid transfer allows speech recognition workloads to be shared among servers, such as those in speech recognition pool 108. As explained earlier, sharing workloads among servers diminishes both the risk of overloading and the incentive for systematic underutilization. Thus, support for transferring active nodes between servers may result in more efficient use of available computing resources. Specific processes for transferring workloads among speech recognition servers are discussed in greater detail below with regard to FIGS. 3 and 4.

While transferring active nodes between servers may provide a viable strategy for sharing workloads, various infrastructure may be required to successfully implement this strategy. A server that receives a set of active nodes can only use those nodes for exploration if it has access to the graph that the nodes are part of. If the graph is an FST, it may be static as described earlier. Identical copies of the same static graph may be stored on each server in a server pool, enabling the various servers to effectively share sets of active nodes selected from the graph. In some embodiments, dynamic graphs may be used instead of a static graph, in which case additional configuration may be required to ensure that the relevant graph (or portions thereof) is available on each server to which a set of active nodes is transferred.

Although a speech recognition server may be able to advance along paths in a graph using a set of active nodes, additional information may be required to decide which paths are worth pursuing, and to identify the best path at the end of exploration. Deciding which paths to pursue and identifying the best path may both require knowledge of the scores associated with each path. In addition, once the best path is identified, it may be necessary to access the set of nodes or arcs in the path in order to determine the output text.

The full set of nodes or arcs for all traversed paths may be much larger than the set of active nodes. Accordingly, while the full set of traversed nodes or arcs may be transferred between speech recognition servers in some embodiments, a separate server pool may be provided as an alternative. For example, system 100 of FIG. 1 includes history pool 110, which may be used to store the arcs or nodes of the traversed paths. These paths may be referred to as a history, and may be stored in the form of a directed graph. This directed graph may be structured as a tree, or it may contain joins. As for the scores associated with each path, a single aggregate score may be stored for each path that is currently being explored, and these scores may be transferred between servers along with the set of active nodes. Alternatively or additionally, score information may be maintained by history servers, e.g., in history pool 110.

In accordance with the foregoing explanation, a server in speech recognition pool 108 may store a set of active nodes while traversing paths in the graph. Each arc or node that is traversed to reach the active nodes may be transmitted to a server in history pool 110 for storage. In some embodiments, traversed arcs or nodes may be collected at the speech recognition server and transmitted to the history server in batches. Each batch may be sent, e.g., after a defined number of frames have been processed, after the batch reaches a defined size, or in response to annotations on certain arcs or nodes. Transmissions from the speech recognition server to the history server may also be compressed, using general purpose data compression algorithms, algorithms specifically tailored to history data, or both. A transmission may specify information about one or more nodes or arcs relative to a previous transmission. For example, the transmission may indicate nodes that have been added or removed from the set of active nodes, along with differences between current and previous scores for nodes that were included in the previous transmission.

Scores associated with each traversed path may be stored by the speech recognition server, the history server, or both. The speech recognition server may stop exploring certain paths in accordance with these scores, and the history server may use these scores to prune or organize the history of traversed paths. When exploration ends for all paths, the score information may be used to identify the best path, and the history may be used to determine the output text. The output text for the best path may be transmitted to a server in task management pool 102, and then to a client device, thereby completing the client's ASR request.

Figure 3:
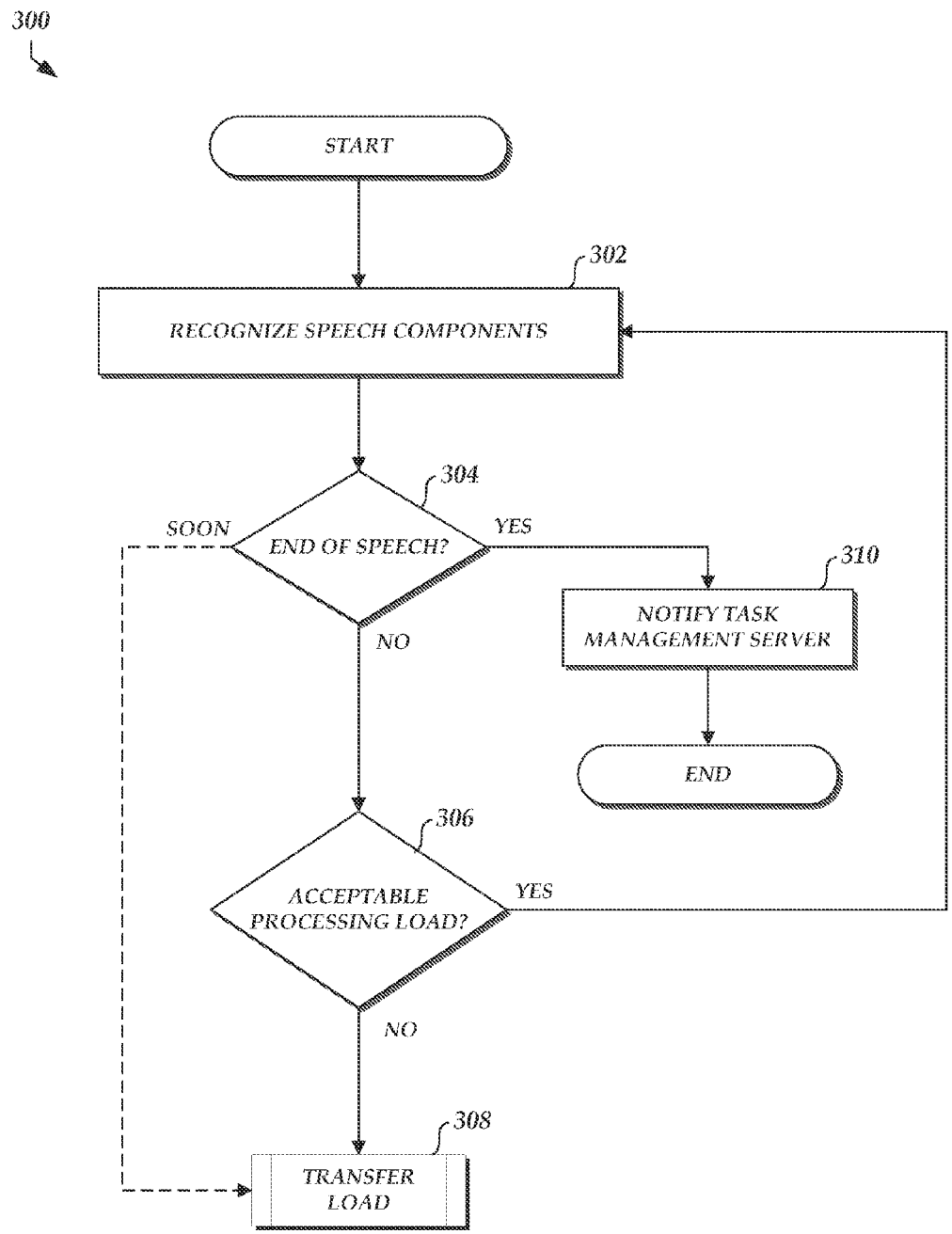
FIG. 3 is a flow diagram of an illustrative process for determining when to transfer an ASR workload from one execution resource to another.

Turning now to FIG. 3, an example process is depicted for determining when to transfer speech recognition workloads between servers in speech recognition pool, such as speech recognition pool 108. Process 300 begins with a speech recognition server recognizing speech components at block 302. Speech components may comprise speech units such as words, parts of phonemes, phonemes, or phonemes in context such as triphones. The speech components may be recognized, e.g., by executing various units of processing corresponding to arcs in an FST or other graph. The units of processing may take features as input, and the features may be received from, e.g., a server in audio processing pool 106. The speech recognition server may thus traverse arcs in the graph, moving from a current set of active nodes to a new set of active nodes in each successive round of exploration.

Process 300 continues to block 304, where the server determines whether the speech it is recognizing has ended. As mentioned above, the speech recognition server may recognize that speech has ended if it reaches an ending node in the graph or runs out of features to process. The speech recognition server may also receive an end-of-speech indication from the audio processing server that was providing the features. If the speech has ended, process 300 continues to block 310, where the task management server is notified that recognition is complete. The task management server may then receive the speech recognition results from the history server, as described previously with respect to FIG. 1, and transmit the results to the client device. If the speech has not ended, process 300 may continue to block 306.

At block 306, the speech recognition server may determine whether the processing load has exceeded or is predicted to exceed an acceptable threshold. As described previously, the computing resources required to recognize speech may vary depending on the structure of the graph and the particular features that are processed. The processing load may be determined at block 306 based, for example, on the current number of active nodes. The processing load may also be determined using a method provided by the server's operating system. Instead of or in addition to determining the current processing load, the server may predict the future processing load in order to anticipate increased demand for computing resources. The workload may then be transferred to a server with greater available capacity before the current server becomes overloaded.

Predictions of future processing load may be aided by annotations embedded in the graph. For example, a current node may be annotated with a number that indicates the average quantity of outgoing arcs at neighbor nodes within a certain proximity of the current node, where proximity is defined as the number of arcs that must be traversed to reach a neighbor node from the current node. An annotation of this sort may be useful for estimating complexity because complexity depends on the number of paths being traversed, and each outgoing arc may correspond to an additional path. Of course, more complicated annotations may also be used. For example, an annotation may comprise an average number of outgoing arcs at neighboring nodes, wherein the average is weighted to emphasize the outgoing arcs from closer neighbors. Annotations may also be based on empirical data. For example, an annotation on a particular node may indicate the average number of paths that were explored in each round of exploration after previous visits to that particular node. Regardless of how an individual annotation is determined, predictions of future processing load may be determined by combining annotations from multiple nodes. For example, the server may predict the load by averaging complexity annotations on all active nodes. In addition, a single node may have multiple annotations indicating, e.g., a predicted level of complexity and a predicted duration for that complexity level.

With continued reference to FIG. 3, if the current or predicted processing load exceeds a predetermined threshold, process 300 may continue to block 308, where the workload is transferred to a server with more available capacity. Alternatively, when the complexity of a particular workload exceeds the threshold, less complex workloads may be transferred away from the server so that the more complex workload may have access to additional resources without being transferred. The transfer threshold for an individual workload may be defined, e.g., in absolute terms or relative to the total processing load on the server. An example process for transferring a workload to a different server is described later with regard to FIG. 4.

In some embodiments, process 300 may include end-of-speech prediction, e.g., at block 304. Such prediction may be used to transfer a workload that is about to finish onto a server that is especially fast or that has a surplus of available resources. Transferring the workload to such a server in anticipation of the end of speech may minimize the lag between the completion of an utterance by a user at a client device and the transmission of ASR results to that device. Predictions for end of speech may be based on empirical or structural annotations, much like the complexity predictions described above with respect to block 306. For example, an annotation for end-of-speech prediction may comprise a number of ending nodes within a certain proximity of a current node, or the average number of processing rounds completed before end of speech for previous workloads that included the current node. If annotations on a set of current nodes indicate that end of speech is imminent, process 300 may continue from block 304 to block 308, where the workload is transferred to server that is faster or has more resources.

Figure 4:
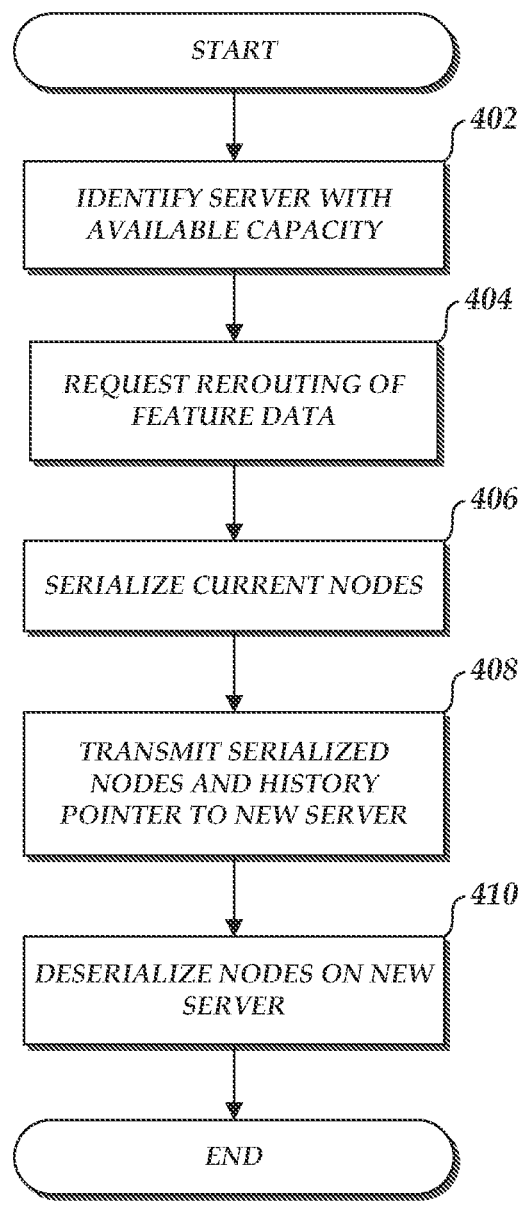
FIG. 4 is a flow diagram of an illustrative process for transferring an ASR workload from one execution resource to another.

FIG. 4 depicts an example process for transferring a workload from one speech recognition server (an "old server") to another (a "new server") based on, e.g., increasing computational complexity or imminent end of speech. Process 400 may be used with the servers in speech recognition pool 108 of FIG. 1. Process 400 may be facilitated by one or more servers in transfer control pool 112. Alternatively, all steps of process 400 may be performed by the speech recognition servers themselves.

Beginning at block 402, a speech recognition server with available capacity is identified. The available capacity at each server in speech recognition pool 108 may be monitored by one or more servers from transfer control pool 112, or the speech recognition servers may monitor each other's availability collectively. In order to facilitate such monitoring, each speech recognition server may periodically transmit information about its availability to transfer control pool 112 or to all other servers in the speech recognition pool. If the transfer control servers are used to monitor availability, a transfer request may be sent from one of the speech recognition servers, and one of the transfer control servers may respond with the availability data necessary to complete block 402.

Process 400 may continue at block 404, where a transmission may be sent to the audio processing server that has been providing features for the workload being transferred. The transmission may include a request for the audio processing server to begin rerouting features to the new server so it can pick up where the old server left off. The transmission may be sent by one of the servers in transfer control pool 112, e.g., in response to the transfer request described above. Alternatively, the request may be sent by the old speech recognition server.

At block 406, the old server serializes the set of active nodes so that they may be transmitted the new server. The serialized nodes may be represented by a plurality of integers, where each integer serves as an identifier for a particular node in the graph. An additional integer or floating-point number may be provided for each active node to indicate the score for a path that ends at that node. At block 408, the serialized nodes are transmitted to the new server. A history pointer may also be transmitted to the new server at this point, so that the new server can continue transmitting traversed arcs or nodes to the same location that was used by the old server. The history pointer may comprise, e.g., an address of a specific history server, or a unique workload identifier that is mapped to a particular history server using a table or a set of rules. At block 410, the active nodes are deserialized on the new server. After block 410 the transfer process is complete, and the new server begins to explore the graph in accordance with process 300 of FIG. 3, using the features from the audio processing server, and transmitting traversed arcs or nodes to the history server identified by the history pointer.

Process 400 is just one example of how speech recognition data may be transferred between servers. Additional, fewer, or different steps may be used in some embodiments. Moreover, as described above, each step may be performed in various ways by various instrumentalities.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method of sharing a speech recognition workload among a plurality of servers, the method comprising:
   performing processing at a first speech recognition server, wherein the performing comprises:
      receiving, at the first speech recognition server, first feature data determined from an audio stream;
      accessing, in a memory of the first speech recognition server, a first data structure corresponding to a directed graph, the graph comprising a plurality of nodes and a plurality of arcs;
      determining, at the first speech recognition server, a second set of active nodes from a first set of active nodes, wherein the first set of active nodes are among the plurality of nodes, and wherein determining the second set of active nodes comprises computing at least one first score using the first feature data and a first arc of the plurality of arcs;
   determining that a processing load for the first speech recognition server has exceeded a threshold;
   transmitting, from the first speech recognition server to a second speech recognition server, information indicating the second set of active nodes;
   performing processing at a second speech recognition server, wherein the performing comprises:
      receiving, at the second speech recognition server, second feature data determined from the audio stream;
      accessing, in a memory of the second speech recognition server, a second data structure corresponding to the directed graph;
      determining, at the second speech recognition server, a third set of active nodes from the second set of active nodes, wherein determining the third set of active nodes comprises computing at least one second score using the second feature data and a second arc of the plurality of arcs; and determining speech recognition results using information relating to a first node of the first set of nodes, a second node of the second set of nodes, and a third node of the third set of nodes.

2. The method of claim 1, further comprising:
transmitting, from the first speech recognition server to a history server, information indicating the second set of active nodes; and
transmitting, from the second speech recognition server to the history server, information indicating the third set of active nodes.

3. The method of claim 1, wherein the directed graph is a finite state transducer, wherein the plurality of nodes correspond to states in one or more hidden Markov models, and wherein the first and second scores are computed based at least in part on Gaussian mixture models associated with said states.

4. A computer system comprising:
a first computing device configured to:
receive first feature data determined from an audio signal;
perform first speech recognition processing, wherein the first speech recognition processing comprises determining a first set of active nodes of a plurality of nodes using the first feature data by computing at least one first score using the first feature data and a first arc of a plurality of arcs, wherein a directed graph comprises the plurality of nodes and the plurality of arcs, wherein the directed graph comprises complexity information, and wherein the first computing device is configured to predict a future processing demand based on the complexity information; and
transmit information relating to the first set of active nodes to a second computing device;
the second computing device configured to:
receive the transmitted information relating to the first set of active nodes from the first computing device;
receive second feature data determined from the audio signal; and
perform second speech recognition processing, wherein the second speech recognition processing comprises determining a second set of active nodes of the plurality of nodes using the second feature data and the first set of active nodes, by computing at least one second score using the second feature data and a second arc of the plurality of arcs.

5. The system of claim 4, further comprising a third computing device configured to:
determine speech recognition results using information relating to nodes from the first set of active nodes or the second set of active nodes.

6. The system of claim 5, wherein the speech recognition results comprise text, a lattice, or a tree.

7. The system of claim 4, wherein the system is further configured to determine that a processing load for the first computing device has exceeded or is likely to exceed a threshold.

8. The system of claim 4, wherein a data structure representing the directed graph is stored in a memory accessible by the first computing device.

9. The system of claim 8, wherein the data structure comprises the complexity information.

10. The system of claim 9, wherein the complexity information is based on structural features of the directed graph.

11. The system of claim 9, wherein the complexity information is based on empirical data.

12. The system of claim 9, wherein the system is further configured to predict an end of speech.

13. The system of claim 12, wherein the end of speech is predicted based on annotations in the data structure.

14. The system of claim 4, wherein the first computing device is configured to transmit information relating to the first set of active nodes to the second computing device based on the future processing demand.

15. Non-transitory computer storage comprising computer-executable instructions to:
receive, at a first computing device, first feature data determined from an audio signal;
perform first speech recognition processing at the first computing device, wherein the first speech recognition processing comprises determining a first set of active nodes of a plurality of nodes using the first feature data by computing at least one first score using the first feature data and a first arc of a plurality of arcs, wherein a directed graph comprises the plurality of nodes and the plurality of arcs, wherein the directed graph comprises complexity information, and wherein the first computing device is configured to predict a future processing demand based on the complexity information;
transmit information relating to the first set of active nodes to a second computing device;
receive, at the second computing device, second feature data determined from the audio signal; and
perform second speech recognition processing at the second computing device, wherein the second speech recognition processing comprises determining a second set of active nodes of the plurality of nodes using the second feature data and the first set of active nodes by computing at least one second score using the second feature data and a second arc of the plurality of arcs.

16. The non-transitory computer storage of claim 15, further comprising instructions to determine that a number of audio frames in a queue associated with the first computing device exceeds a threshold.

17. The non-transitory computer storage of claim 15, further comprising instructions to:
transmit information related to the first set of active nodes to a third computing device; and
transmit information related to the second set of active nodes to the third computing device.

18. The non-transitory computer storage of claim 17, further comprising instructions to determine speech recognition results at the third computing device.

19. The non-transitory computer storage of claim 15, further comprising instructions to predict a future processing load.

20. The non-transitory computer storage of claim 15, further comprising instructions to predict an end of speech.

21. The non-transitory computer storage of claim 15, further comprising instructions to transmit information relating to the first set of active nodes to the second computing device based on the future processing demand.

* * * * *